United States Patent [19]

Rudolph

[11] Patent Number: 5,332,136
[45] Date of Patent: Jul. 26, 1994

[54] SUPPORT APPARATUS FOR AN OPTICAL INSTRUMENT

[76] Inventor: John H. Rudolph, 1685 Arroyo Dr., Laguna Beach, Calif. 92651

[21] Appl. No.: 158,161

[22] Filed: Nov. 26, 1993

Related U.S. Application Data

[63] Continuation-in-part of Ser. No. 68,515, May 26, 1993, abandoned.

[51] Int. Cl.$^5$ .................. F16M 11/04; G03B 29/00
[52] U.S. Cl. ............................ 224/185; 224/191; 224/242; 224/908; 224/909; 294/139; 354/293; 352/243
[58] Field of Search .......... 354/293; 352/243; 294/139; 224/908, 909, 185, 191, 242, 250

[56] References Cited

U.S. PATENT DOCUMENTS

| | | | |
|---|---|---|---|
| 2,607,134 | 7/1952 | Burnam | 224/185 |
| 2,658,435 | 11/1953 | Sarvoy | 224/185 |
| 2,712,779 | 7/1955 | Tolcher | 294/139 |
| 2,771,826 | 11/1956 | Shapiro | 224/908 X |
| 2,806,416 | 9/1957 | Jones, Jr. | 294/139 |
| 4,083,480 | 4/1978 | Lee et al. | |
| 4,437,753 | 3/1984 | Dunn | 354/293 |
| 4,542,966 | 9/1985 | Knaudt | |
| 4,557,451 | 12/1985 | Conway | 224/909 X |
| 4,943,820 | 7/1990 | Larock | |
| 4,946,272 | 8/1990 | Brown | 352/243 |
| 5,073,788 | 12/1991 | Lingwall | |
| 5,098,182 | 3/1992 | Brown | 352/243 |
| 5,111,983 | 5/1992 | Simmons et al. | 224/258 |

FOREIGN PATENT DOCUMENTS

0202432  10/1985  Japan ................... 294/139

*Primary Examiner*—Ernest G. Cusick
*Attorney, Agent, or Firm*—Macro-Search Corp.

[57] ABSTRACT

Disclosed is a support apparatus for an optical instrument, such as a camera or binoculars. A generally rectangular mounting platform for holding the instrument in a preferred attitude includes a first securing slot for removable attachment of the instrument to the platform. A second securing slot provides removable attachment of additional accessories, such as an elongate brace comprising a plurality of interengaged tubes for telescoping extension of the brace. The brace extends downwardly from the platform when engaged therewith, providing a propping capability of the brace. Further, the elongate brace includes a belt engagement clip at its distal end such that the brace may be rested between a belt of a person and an associated garment adjacent to the belt for improved anchoring of the brace. The platform may provide two upwardly curved end portions for cradling a binocular therebetween, and a strap for holding the binocular in place on the platform. A hinged brace arm is pivotally engaged with the platform and includes a plurality of segments mutually telescopically engaged. As such, the brace arm may be extended into contact with the chest and shoulder area of a person using the instrument for improved support of the platform and the instrument. The brace arm further includes a stabilizer bar pivotally fixed to the brace arm for providing lateral stability to the platform and the instrument when the platform is placed on a flat horizontal surface.

11 Claims, 4 Drawing Sheets

SUPPORT APPARATUS FOR AN OPTICAL INSTRUMENT

This is a continuation-in-part of previously filed application Ser. No. 08/068,515 filed May 26, 1993, now abandoned.

FIELD OF THE INVENTION

This invention relates to photography and viewing instruments and more particularly to accessories that improve picture and viewing quality by supporting weight and reducing shaking and jiggling of hand held and non-hand held camcorders, movie cameras, still cameras with telephoto lenses, binoculars, and the like.

BACKGROUND OF THE INVENTION

The purpose of cameras, binoculars and other instruments of this type, is to effect clear and sharp pictures and vision. Clearly any accessory that reduces shaking and jiggling of hand held instruments would be an important tool. Camcorders, movie cameras, still cameras with telephoto lenses, and binoculars, during prolonged use, are fatiguing when hand held. Therefore, a telescoping rod, which diverts weight from hands and arms to a waist belt support clip, is very useful. Since a considerable amount of photography and binocular viewing occurs when the operator or viewer is ambulatory, a stabilizing support, attached to camera or binocular directed rearwardly to the upper chest, would provide desirable stability. Since novice and professional photographers alike often require absolute immobility of their equipment, it is reasonable to provide a means to insure solid immobile support. Therefore, an optional tripod with precision horizontal and vertical lens adjustment is desirable. To create better pictures and enhance the quality of viewing through binoculars, it is logical that such a support accessory device contain such amenities and controls. Brown in U.S. Pat. No. 4,946,272 teaches a stabilized support of compact size and light weight. Dunn in U.S. Pat. No. 4,437,753 shows a camera support for stabilizing against the shoulder area of the user. Rauscher (3,882,524), Knaudt (4,542,966), Simmons et al (5,111,983), Lee et al (4,083,480), Lingwall (5,073,788), Larock (4,943,820), and Brown (5,098,182) all teach various means for holding a camera or other instrument for improvements in steadiness, balance, support and various other features. For the most part these devices are either crude, ill conceived, or are complex and expensive to manufacture. The basic needs of the professional or occasional instrument user, as defined above, are not met by such devices. What is truly needed is a compact, foldable, multipurpose, accessorized support device which would provide, in a single assembly or system, the ability to securely mount a camera or other instrument, provide improved hand holding features, body propping and support for reduction of arm and hand fatigue, and provide a surface supporting system with elevation adjustment. The instant invention does provide all of the above in a simple, inexpensive and easily fabricated package.

SUMMARY OF THE INVENTION

The present invention is a support apparatus for an optical instrument, such as a camera or binoculars. A generally rectangular mounting platform for holding the instrument in a preferred attitude includes a first securing means for removable attachment of the instrument to the platform. A second securing means provides removable attachment of additional accessories. One such accessory is an elongate brace comprises a plurality of interengaged tubes for telescoping extension of the brace, and provides an engagement means at one end thereof for removable engagement with the second securing means of the platform. The brace extends downwardly from the platform when engaged therewith, providing a propping capability of the brace. Further, the elongate brace includes a belt engagement means at the other end such that the brace may be rested between a belt of a person and an associated garment adjacent to the belt for improved anchoring of the brace.

The platform may provides two upwardly curved end portions for cradling a binocular therebetween, and includes an adjustable, flexible strap attached between the end portions for further holding the binocular in place on the platform. A hinged brace arm is pivotally engaged with the platform. The brace arm may assume an extended position and be locked in place, or a retracted position against the platform for compact storage. The brace arm includes a plurality of segments mutually telescopically engaged. As such, the brace arm may be extended into contact with the chest and shoulder area of a person using the instrument for improved support of the platform and the instrument. A cushioned pad is included at the distal end of the brace arm for resting against the chest and shoulder area of the person using the instrument. The brace arm further includes a stabilizer bar pivotally fixed to the brace arm positionable in line with the brace arm for storage of the stabilizer bar. Alternately, the stabilizer bar is positionable in orthogonal alignment with the brace arm such that with the platform placed on a flat horizontal surface, and with the brace arm in the retracted position, the stabilizer bar provides lateral stability to the platform and the instrument.

The present invention is a compact, foldable, multipurpose, accessorized support device which provides, in a single system, the ability to securely mount a camera or other instrument. The present device further provides improved hand holding features, body propping and support for reduction of arm and hand fatigue, and provides a surface supporting system with elevation adjustment. Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
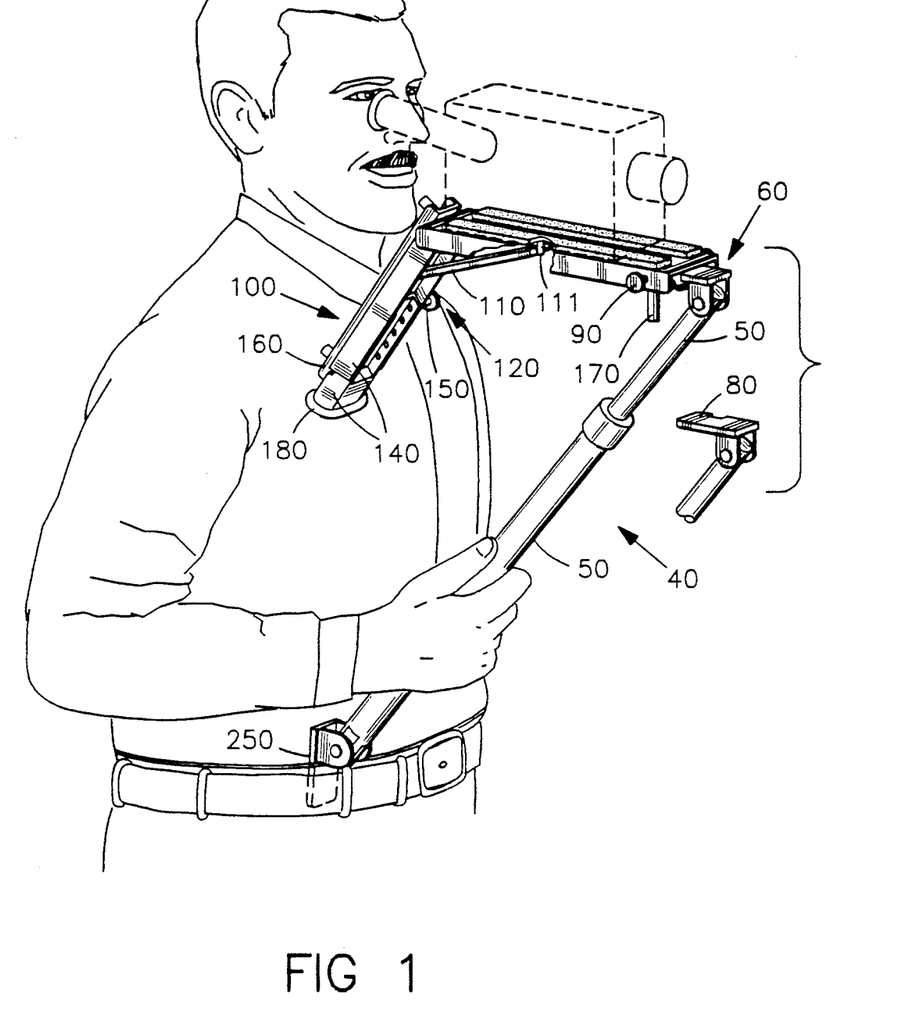
FIG. 1 is a perspective illustration of the invention, illustrating a support platform, a brace, and a brace arm of the invention, and a camera in phantom outline.
Figure 2:
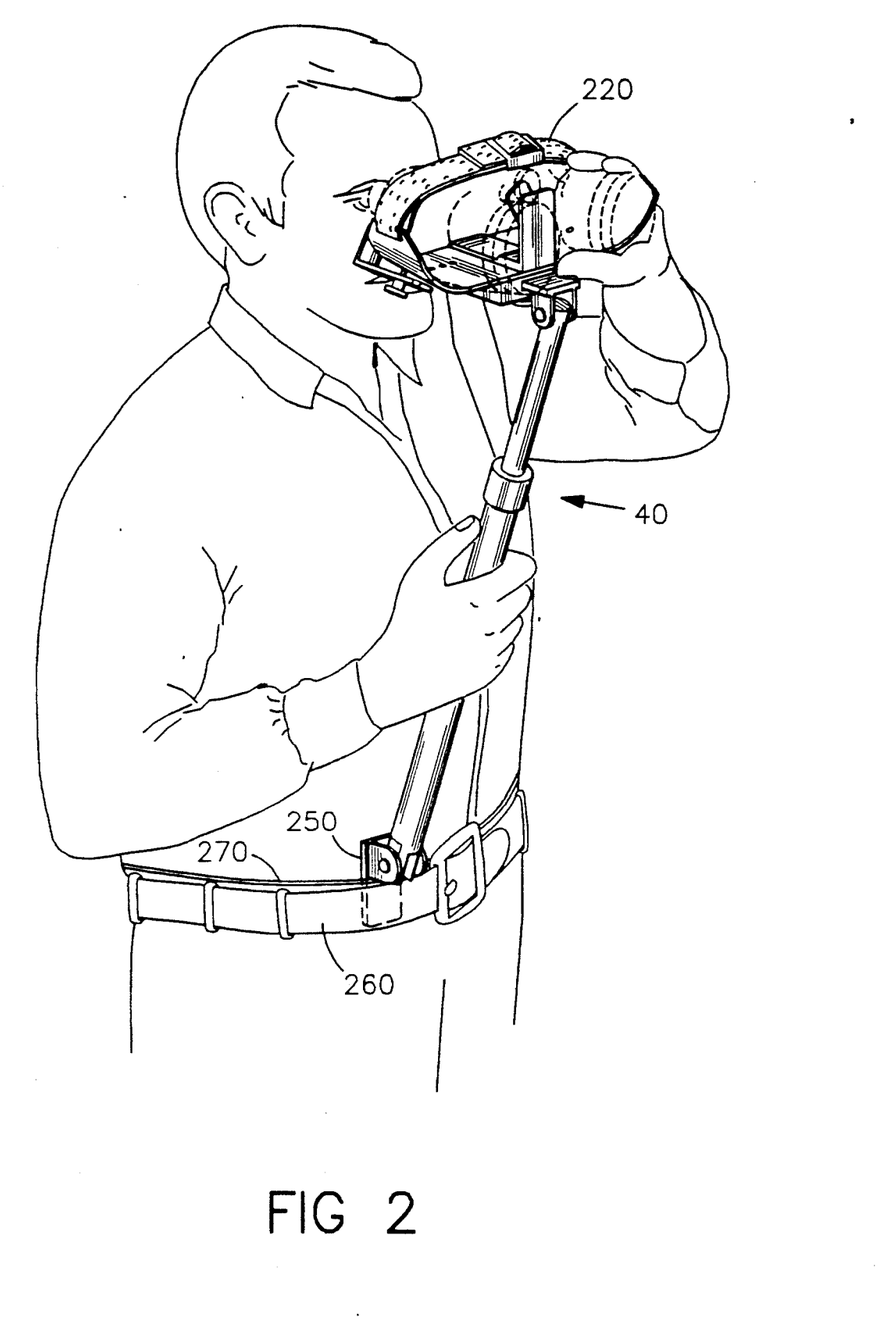
FIG. 2 is a perspective illustration of the invention, illustrating a support platform with a binocular in phantom outline.

FIGS. 1 and 2 illustrate a support apparatus for an optical instrument, such as a camera or binoculars. A generally rectangular mounting platform 10 for holding the instrument in a preferred attitude includes horizontal mounting surface 12, and a proximal and distal sides 14, 16 respectively a first securing means 20 for removable attachment of the instrument to the platform 10. The first securing means 20 includes a slot 200 and a sliding bolt 21 that engages the instrument and can pass through the slot 200 when aligned with the slot 200, but cannot pass through the slot when not aligned with the slot 200. As such, selective mounting of the instrument at a desired position on the platform 10 is achieved by rotating the bolt 21 so that it is orthogonal to the slot 200. A second securing means 30 provides removable attachment of additional accessories. The second securing means 30 is at least one horizontal engagement slot 70 positioned on at least one side of the platform 10, but preferably is a pair of slots 70 positioned on opposing sides of the platform 10, such as sides 14 and 16. The platform 10 is manufactured from a rigid yet lightweight material, such as aluminum or plastic. Further, cushioning means such as rubber pads are included on the platform for cushioning the instrument.

Figure 5:
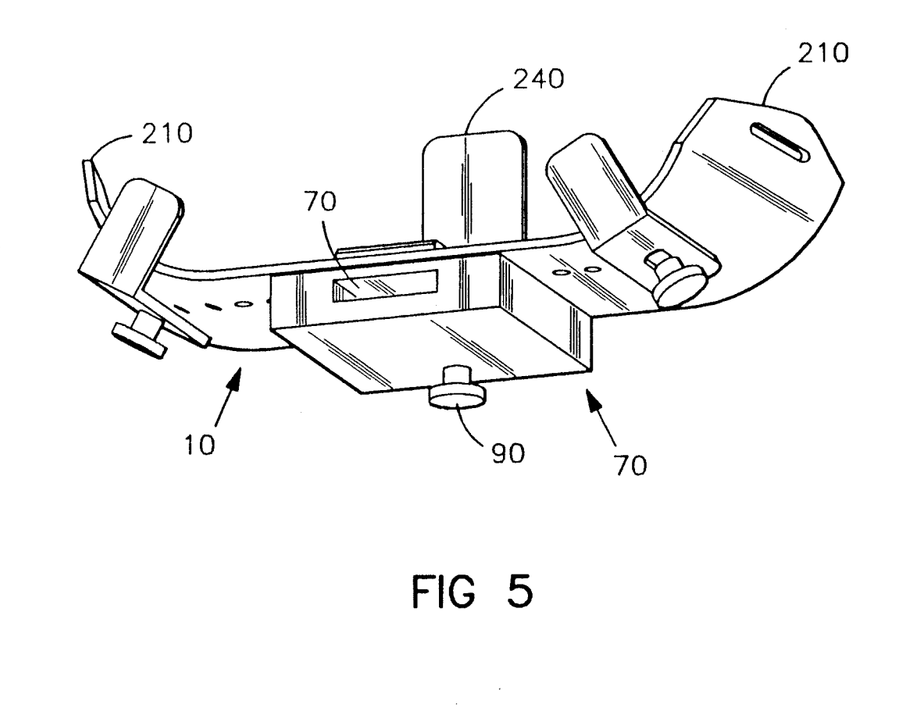
FIG. 5 is a perspective illustration of the invention, illustrating the support platform for holding a binocular.

In one embodiment, the platform 10 further provides two upwardly curved end portions 210 for cradling a binocular therebetween, and includes an adjustable, flexible strap 220 attached between the end portions 210 for further holding the binocular in place on the platform 10 (FIGS. 2 & 5). A pair of rigid L-shaped brackets 230 are adjustably fixed to the platform 10 and extend upwardly therefrom for adjustable contact engagement with the rear of the binocular. A front upwardly extending stop bar 240 contacts the front of the binocular, whereby the binocular is sandwiched between the L-shaped brackets 230 and the stop bar 240 for holding the binocular at a preferred position on the platform 10.

An elongate brace 40 comprises a plurality of interengaged tubes 50 for telescoping extension of the brace 40, and provides an engagement means 60 at one end thereof for removable engagement with the second securing means 30 of the platform 10. The brace 40 extends downwardly from the platform 10 when engaged therewith, providing a propping capability of the brace 40. Preferably, the engagement means 60 of the brace 40 is a tongue 80 for slidable insertion into any of the engagement slots 70 of the second securing means 30. Each tongue 80 takes a U-shaped 280 (FIG. 4) for providing snap-on compressive holding of the tongue 80 in the second securing means 30. The platform 10 further includes a first locking means 90 for each slot 70 for holding the tongue 80 in the slot 70. Locking means 90 is typically a threaded screw having either a knurled head or a wing shaped head. The threaded shank portion of the screw penetrates the platform 10, engaging a threaded hole therein, so that the locking means 90 may be turned into the threaded hole to engage the tongue 80 for locking it in place in the manner of a set screw.

Figure 4:
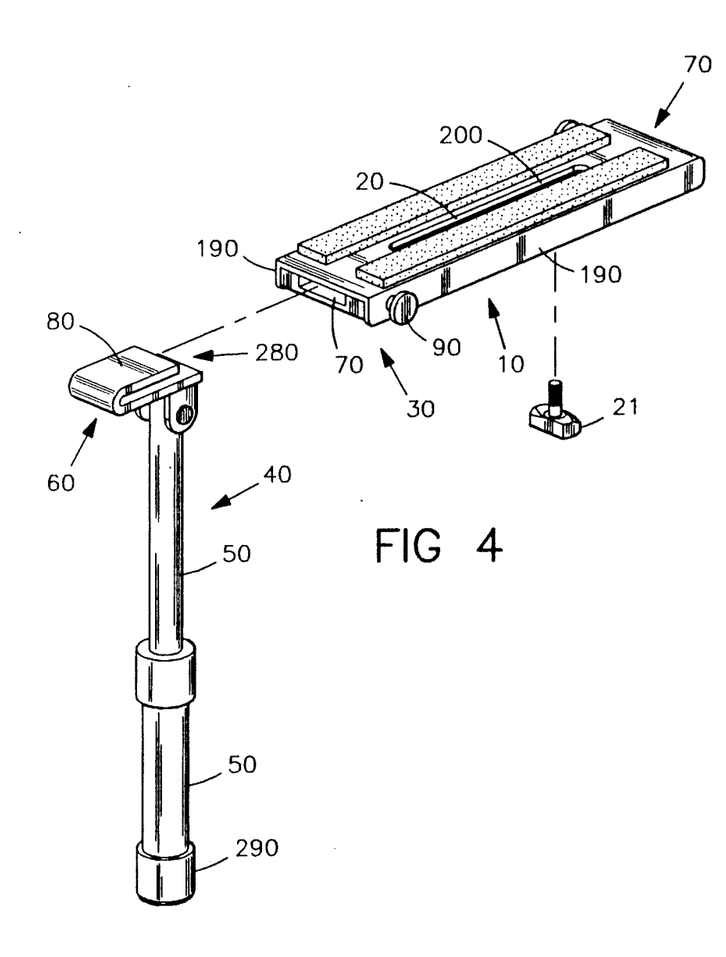
FIG. 4 is an exploded perspective illustration of the invention, illustrating an engagement means of the brace, cushioning pads of the platform, and a sliding bolt of the invention.

Further, the elongate brace 40 includes a belt engagement means 250 at the other end such that the brace 40 may be rested between a belt 260 of a person and an associated garment 270 adjacent to the belt 260 for improved anchoring of the brace 40 (FIG. 1). The belt engagement means 250 may include means for removable attachment to the belt, such as a spring-like clip (not shown). Alternately, the elongate brace 40 includes an elastomeric bumper 290 at the other end thereof for more comfortable support (FIG. 4).

A hinged brace arm 100 is preferably included and, at one end, is pivotally engaged with the platform 10. A fold-out locking strut 110, hinged to the brace arm 100, lays between the brace arm 100 and a pin 111 that extends from the platform 10. As such, the brace arm 100 may assume an extended position 120 (FIG. 1) and be locked in place by the strut 110, thereby providing a handle for manually holding the platform 10. The brace arm 100 is pivotally positionable to a retracted position 130 (FIG. 3) against the platform 10 for compact storage.

Figure 3:
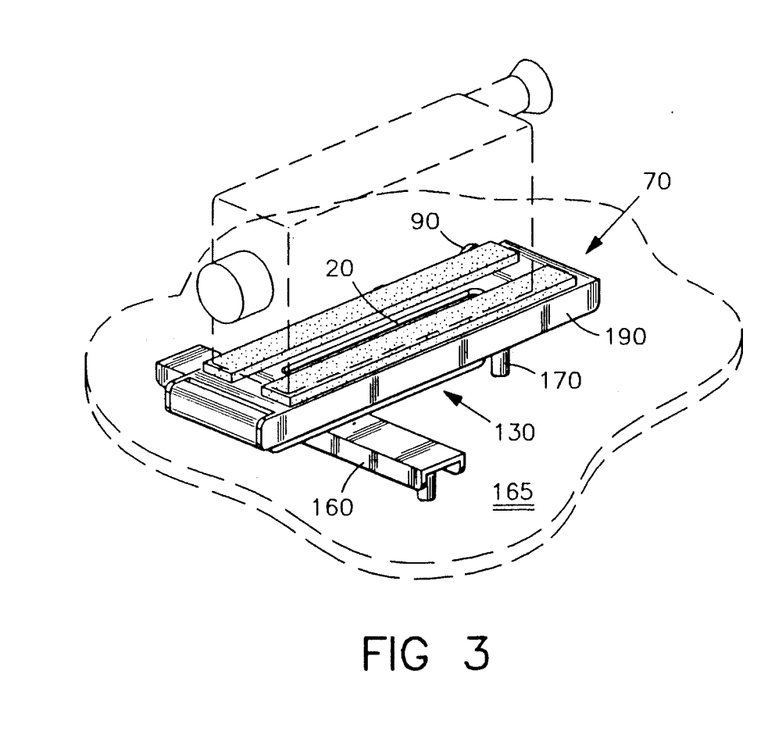
FIG. 3 is a perspective illustration of the invention, illustrating the camera in phantom outline, and the platform of the invention resting on a flat surface and stabilized by a stabilizing arm of the invention.

The brace arm 100 may include a plurality of segments 140 mutually telescopically engaged. As such, the brace arm 100 may be extended into contact with the chest and shoulder area of a person using the instrument for improved support of the platform 10 and the instrument (FIG. 1). At least one second locking means 150 engages at least two of the segments 140 of the brace arm 100, for fixing the length of the brace arm 100. Locking means 150 is preferably a set screw or a spring loaded locking pin or other simple, well known, device for effectively engaging holes or dimples in at least one of the telescoping segments 140 of the brace arm 100 as is well known in the prior practice and art. A cushioned pad 180 is included at the distal end of the brace arm 100 for resting against the chest and shoulder area of the person using the instrument. The brace arm 100 further includes a stabilizer bar 160 pivotally fixed to the brace arm 100 and positionable in line with the brace arm 100 for storage of the stabilizer bar 160. Alternately, the stabilizer bar 160 is positionable in orthogonal alignment with the brace arm 100 such that with the platform 10 placed on a flat horizontal surface 160, and with the brace arm 100 in the retracted position 130, the stabilizer bar 160 provides lateral stability to the platform 10 and the instrument (FIG. 3).

The platform 10 further includes a front elevational screw 170 extending downwardly from the platform 10 for adjusting the elevational attitude of the platform 10. Further, the platform 10 is formed in an integral U-shape for providing a pair of spaced apart downwardly extending sides 190. The brace arm 100 fits between the sides 190 for storage of the brace arm 100 when pivotally folded between the sides 190 of the platform 10.

Figure 6A:
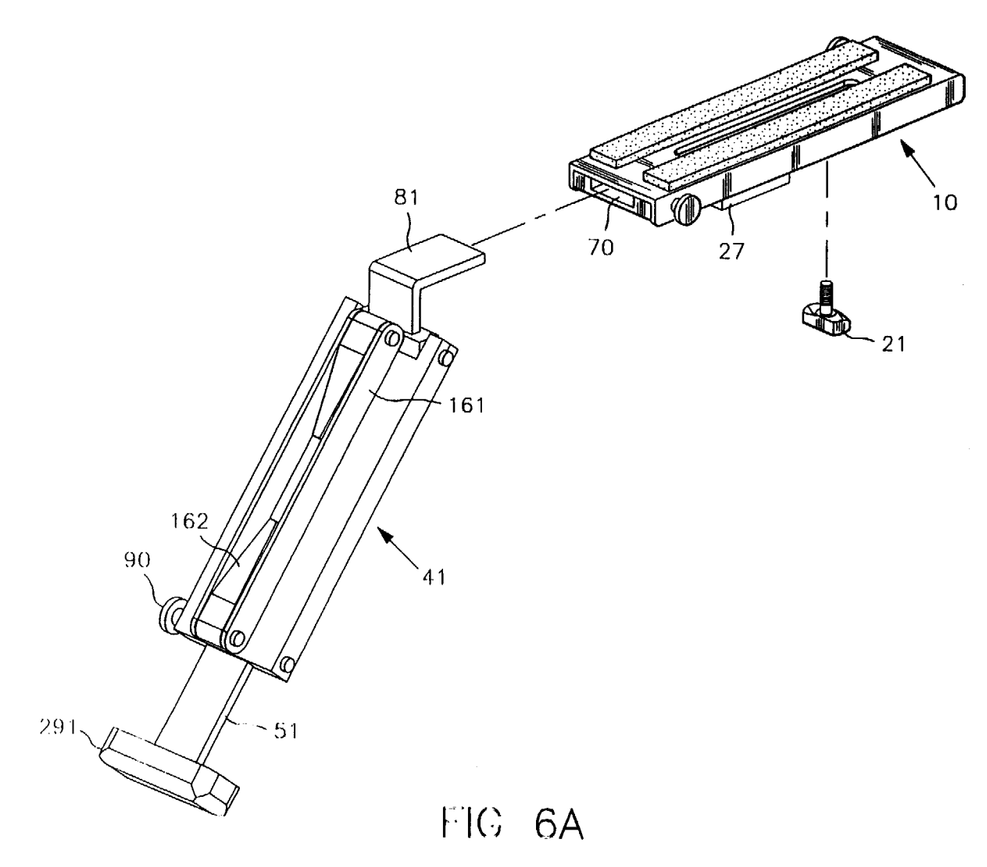
Figure 6B:
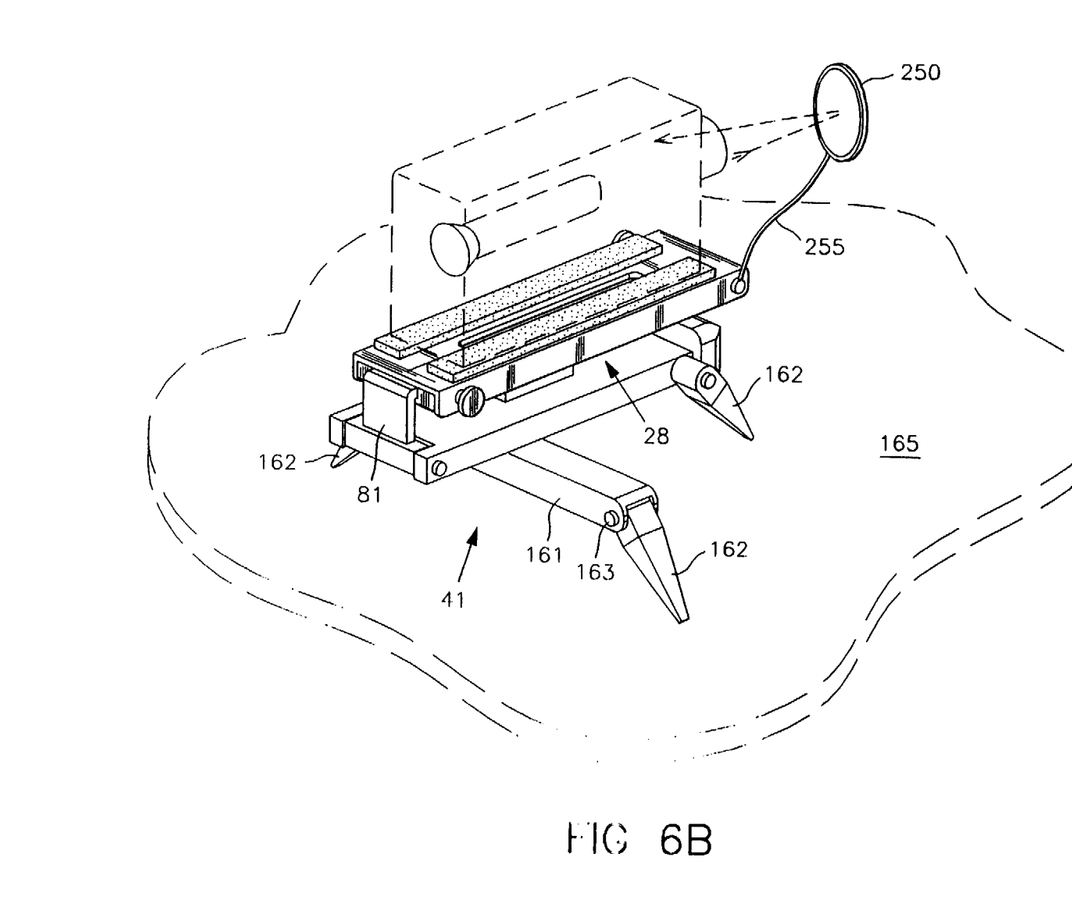

FIG. 6A illustrate an alternate embodiment brace-stand 41 which may be used in place of brace 40. Brace-arm 41 provides an "L" shaped tongue 81 for engaging slot 70 and includes an extensible leg 51 which telescopes into brace-stand 41 for adjustable extension length as is easily fixed at a selected length by first locking means 90 preferably a simple set screw threaded into brace-stand 41. Bumper 291 is fixed at the distal end of leg 51 for comfortable and stable contact with a bracing surface such as the chest or other relatively firm portion of the anatomy. As shown in FIG. 6B, the brace-stand 41 is quickly and very easily converted from use as a brace (FIG. 6A), to use as a unique stand. Brace-Stand 41 includes rotatable stabilizer bar 161 which can be rotated to a position orthogonal to the general length of brace 41. Tongue 81 is mounted pivotally at one end of brace 41, so that brace 41 may be folded under platform 10. Because it is desirable to mount a universal tripod adapter 27 to the underside of platform 10, tongue 81 is constructed to provide a clearance space 28 between the brace-stand 41 and the platform 10 when these two elements are folded into parallel positions. Space 28 provides clearance for the tripod adapter. In order to assure that the platform can be leveled on a rough or uneven surface 165, stabilizer bar 161 contains folding feet 162, one pivotally secured within bar 161 at each end. The feet 162 are frictionally fixed by pivot pins 163 so that each of the feet 162 is able to be positioned at any angle over its full folding range and will remain at the set angle while supporting the weight of the camera or other equipment. A third foot 162 may be pivotally fixed to the brace-stand 41, as shown in FIG. 6B, for three point support of the camera.

Mirror 250 may be fixed to a flexible support arm 255 on the platform 10. A remote control device (not shown) may then be used from a distance of up to 30 feet from the camera to trigger start and stop camera function. The flexible support arm 255 allows the mirror to be positioned to assure reflection of the control beam from the remote control device to a camera mounted sensor. Such sensors and remote controls are well known in the technology, but the remote actuation of a camera from behind by the use of a supported mirror is novel in the present invention. This unique approach can be useful in filming wild life without being detected.

Figure 7:
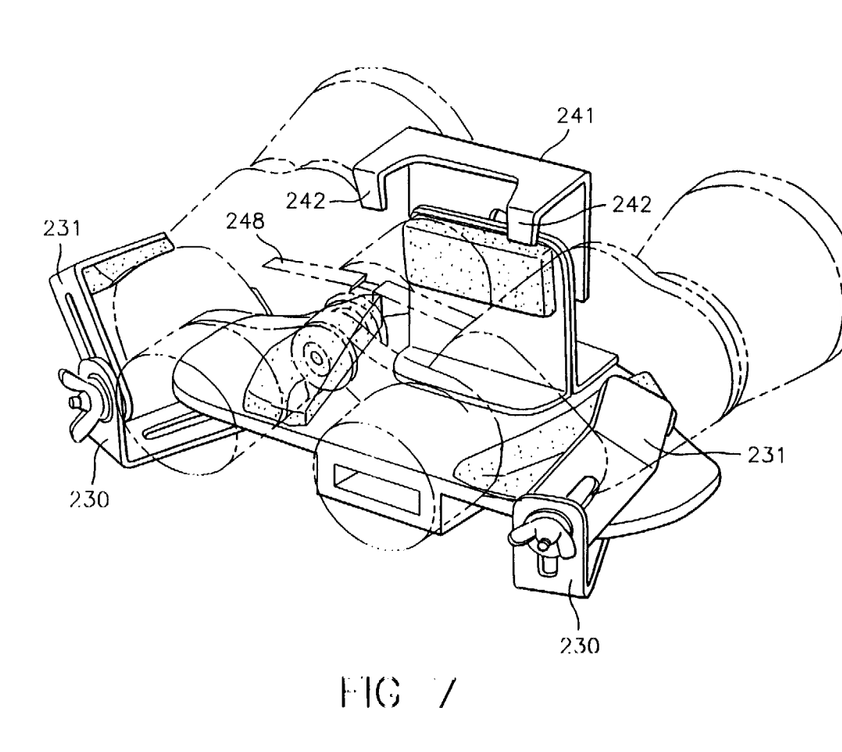
Figure 8:
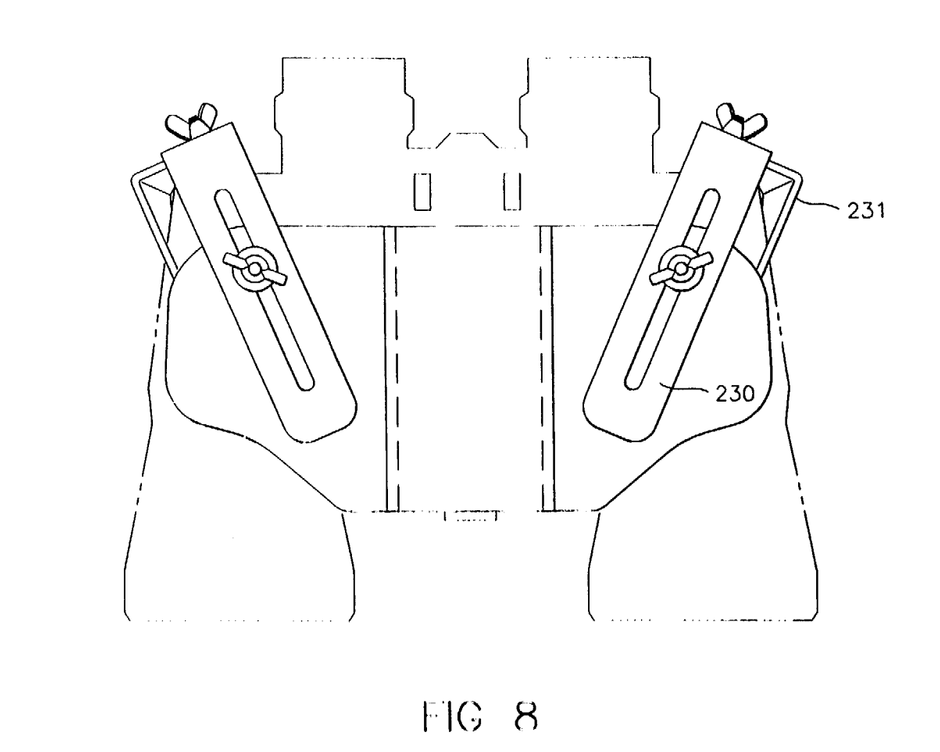

FIGS. 7 and 8 illustrate an alternate use of the invention with binoculars. In a modification of the apparatus as shown in FIG. 5, the upwardly curved portions 210 may be flat as best seen in FIG. 7. The "L" shaped brackets 230 are modified to contain slots for mounting second "L" shaped brackets 231 adaptively fixed to brackets 230 with wing nuts and screws. This unique arrangement allows the combination of bracket 230 and 231 to adapt to different sizes and shapes of binoculars. The stop bar 240 shown in FIG. 5, may, in an alternate embodiment, further include an inverted "J" shaped structural element 241 which is vertically adjustable with respect to bar 240. the element 241 includes opposing fingers 241 which are adapted to engage a cross bar 248 which most binoculars have. In this way, the binoculars are fully engaged by the attachment elements of the invention so that they may be mounted onto a tripod, supported by the brace 41 or engaged with other support or holding devices.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. A support apparatus for an instrument comprising:
   a generally rectangular mounting platform including an upwardly facing horizontal mounting surface having an elongated slot for removable attachment of the instrument to the platform and a pair of horizontal engagement slots in two opposing sides of the platform;
   a brace arm including a pivotal engagement tongue at one end thereof and an extension leg slidably contained within the arm and adjustably extendible from the other end of the arm, the tongue adapted for engaging either one of the horizontal engagement slots of the platform such that the arm is pivotally positionable for assuming a desired angle with respect to the platform for support of the platform against a near vertical surface, the brace arm further being pivotally positionable into a horizontal orientation under the platform for support thereof on a near horizontal surface;
   a stabilizer bar pivotally, rotatably attached to the brace arm and positionable in line with the brace arm for storage of the stabilizer bar, and alternately positionable in approximate orthogonal alignment with the brace arm such that with the brace arm folded under the platform, the stabilizer bar provides lateral stability to the platform and instrument.

2. The support apparatus for an instrument of claim 1 wherein the brace arm includes a plurality of segments mutually telescopically engaged such that the brace arm may be extended into contact with the chest and shoulder area of a person using the instrument for improved support of the platform.

3. The support apparatus for an instrument of claim 1 wherein the elongate brace includes an elastomeric bumper at the other end thereof for more comfortable support.

4. The support apparatus of claim 1 wherein the stabilizer bar includes a pair of folding feet pivotally secured within the stabilizer bar at each end thereof, and further including a third foot pivotally secured to the platform, the feet frictionally mounted so that each of the feet may be positioned at any angle over a selected range, and remain fixed at said angle while supporting the weight of the instrument on a non-flat surface.

5. The support apparatus of claim 1 wherein the tongue is adapted so that with the brace arm folded into parallel alignment with the platform, a space is provided between said arm and platform for a tripod adapter or other accessory.

6. The support apparatus for an instrument of claim 1 wherein the platform provides two lateral integral and contiguous, horizontally extending portions for extending the horizontal mounting surface, the surface thereby being adapted for receiving a binocular for resting thereupon, the surface further including a proximal and a distal binocular holding means for stabilized support of the binocular on the mounting surface, the binocular being sandwiched between the holding means, wherein the distal holding means is an upwardly extending inverted "J" shaped arm positioned adjacent to the distal side, the arm providing a pair of spaced apart downwardly extending fingers for engaging the binocular to hold and support same on the mounting surface.

7. The support apparatus for an instrument of claim 6 wherein the proximal holding means is a pair of horizontal spaced apart, upwardly extending "C" shaped arms positioned adjacent to the proximal side, and further extending toward the distal side for engaging the binocular to hold and support same on the mounting surface.

8. The support apparatus of claim 7 wherein the "C" shaped arms include upper and lower portions adapted for pivoting such that the upper portions of the arms may be brought into contact with oblique surfaces of the binocular.

9. The support apparatus for an instrument of 6 further including a pair of L-shaped brackets adjustably fixed to the platform and extending upwardly therefrom for adjustable contact engagement with the rear of the binocular, and a from upwardly extending stop bar for contact engagement with the front of the binocular, the binocular being sandwiched between the L-shaped brackets and the stop bar for holding the binocular at a preferred position on the platform.

10. The support apparatus for an instrument of claim 1 further including a mirror fixed to a flexible support arm, the arm further fixed to the platform, the support arm being adjustable for positioning the mirror for reflecting a remote control beam originating behind the instrument, into the instrument, for controlling a remote on-off function from a distance.

11. The support apparatus for an instrument of claim 1 wherein the tongue is U-shaped, providing snap-on compressive holding of the tongue in the second securing means.

* * * * *

UNITED STATES PATENT AND TRADEMARK OFFICE
CERTIFICATE OF CORRECTION

PATENT NO. : 5,332,136
DATED : Jul. 26, 1994
INVENTOR(S) : John H. Rudolph

It is certified that error appears in the above-indentified patent and that said Letters Patent is hereby corrected as shown below:

DRAWINGS:

Add figures 6A, 6B, 7 and 8 in the application.

UNITED STATES PATENT AND TRADEMARK OFFICE
CERTIFICATE OF CORRECTION

PATENT NO. : 5,332,136
DATED : Jul. 26, 1994
INVENTOR(S) : John H. Rudolph

Page 2 of 6

It is certified that error appears in the above-indentified patent and that said Letters Patent is hereby corrected as shown below:

Column 2, line 68

In the description of Fig. 4, delete the final "and".

In the description of Fig. 5, replace the final period with a semi-colon.

Add, after the description of Fig. 5, as follows:

--Fig. 6A is a perspective illustration of a brace stand, the mounting platform and the sliding bolt of the invention;

--Fig. 6B is a perspective illustration of the mounting platform showing the use of a mirror for remote control actuation of a camcorder;

--Fig. 7 is an alternate view to Fig. 5, showing further details of the mounting and holding of a binoculars on the invention; and --Fig. 8 is a bottom view of Fig. 7 of the invention.

Signed and Sealed this

Nineteenth Day of November, 1996

Attest:

BRUCE LEHMAN

*Attesting Officer*  *Commissioner of Patents and Trademarks*